United States Patent
Onuma

(10) Patent No.: US 7,750,746 B2
(45) Date of Patent: Jul. 6, 2010

(54) OSCILLATOR DEVICE AND OPTICAL DEFLECTION DEVICE

(75) Inventor: Kazufumi Onuma, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/363,534

(22) Filed: Jan. 30, 2009

(65) Prior Publication Data

US 2009/0201095 A1 Aug. 13, 2009

(30) Foreign Application Priority Data

Feb. 13, 2008 (JP) ............................. 2008-031195

(51) Int. Cl.
*H03B 5/30* (2006.01)
*H03L 7/00* (2006.01)

(52) U.S. Cl. ........................................ 331/154; 331/34

(58) Field of Classification Search ............. 311/16–18, 311/25, 34, 35, 154–164, 173, 175, 179, 311/182, 183
See application file for complete search history.

(56) References Cited

U.S. PATENT DOCUMENTS 6,569,109 B2 * 5/2003 Sakurai et al. ................. 601/2
7,239,437 B2 7/2007 Turner et al. ................ 359/224

FOREIGN PATENT DOCUMENTS

| JP | 2004-129073 | 4/2004 |
| JP | 2005-241482 | 9/2005 |
| JP | 2005-292627 | 10/2005 |

\* cited by examiner

*Primary Examiner*—David Mis
(74) *Attorney, Agent, or Firm*—Fitzpatrick, Cella, Harper & Scinto

(57) ABSTRACT

An oscillator device includes an oscillation system including an oscillator and a resilient supporting member, a driving member configured to supply a driving force to the oscillation system based on a driving signal, and a driving frequency control unit configured to control a driving frequency of a driving signal to be outputted to the driving member, wherein, when an oscillation frequency of the oscillator is to be changed from a current oscillation frequency to a target oscillation frequency, the driving frequency control unit temporarily outputs, to the driving member, a driving signal having a driving frequency which is made different from the target oscillation frequency, being changed from the current driving frequency and beyond the target oscillation frequency, thereby to cause the driving member to drive the oscillation system.

9 Claims, 7 Drawing Sheets

OSCILLATOR DEVICE AND OPTICAL DEFLECTION DEVICE

FIELD OF THE INVENTION AND RELATED ART

This invention relates to a technique associated with an oscillator device having an oscillator supported for oscillatory motion. More specifically, the invention concerns an oscillator device, an optical deflection device using the same and a driving method for an oscillation system of an oscillator device. This optical deflection device is suitably usable in an image forming apparatus such as a scanning display unit, a laser beam printer and a digital copying machine, for example.

Resonance type optical deflecting devices currently proposed have the following features, as compared with optical-scanning optical systems using a rotary polygonal mirror such as a polygon mirror, that: the optical deflecting device can be made quite small in size; the power consumption is slow; and theoretically there is no surface tilt of the mirror surface. On the other hand, in the resonance type optical deflecting devices, the resonance frequency of the oscillator of the oscillation system varies due to production variation or the environment such temperature, for example.

In conventional resonance type optical deflecting devices, generally the device is driven while the driving frequency of the driving signal is held fixed to a frequency around the resonance frequency. In these cases, based on detection of the position of the scanning beam scanningly deflected by the oscillator of the oscillation system or, alternatively, by using detecting means for detecting the angle of the oscillator, the time whereat the scanning beam arrives at a predetermined scanning position or the time whereat the oscillator takes a predetermined angle is measured. Then, the device is so controlled that this time becomes equal to a reference time (see Japanese Laid-Open Patent Application No. 2005-292627).

However, if the resonance frequency is different due to the production variation or environment such as temperature, the resonance frequency of the oscillator has to be detected at the start of the driving. Here, it is known that, in order to measure the resonance characteristic of the oscillation system, it is necessary to change the oscillation frequency of the oscillator several times (see Japanese Laid-Open Patent Application No. 2005-241482). Furthermore, it is known that, since the resonance frequency of the oscillator varies even during the driving due to the temperature or any other varying factor, the oscillation frequency has to be adjusted to meet such variation (see Japanese Laid-Open Patent Application No. 2004-129073).

SUMMARY OF THE INVENTION

However, in high-efficiency resonance type oscillation systems having an oscillator and a torsion spring, when the oscillation frequency of the oscillator is going to be changed to a target oscillation frequency, even if the driving frequency of the driving signal is changed to the target frequency, it takes a certain time until the oscillation frequency actually reaches the target frequency. Particularly, around the resonance frequency, since the driving force is small relative to the inertia force, the change of the oscillation frequency has a time constant and the time necessary for changing the oscillation frequency becomes longer. For example, in a case where the Q-value of the resonance characteristic of the oscillation system is around 1,000, time of around 0.5 second may be needed. This has an influence on the length of time required for starting the driving, when the oscillation system is incorporated into a laser beam printer, for example. Particularly, if the driving frequency is changed several times to detect the resonance frequency at the start of the driving of the laser beam printer, the time required for the driving start becomes longer.

The present invention provides an oscillator device and an optical deflection device by which at least one of the inconveniences mentioned above can be removed or reduced.

In accordance with an aspect of the present invention, there is provided an oscillator device, comprising: an oscillation system including an oscillator and a resilient supporting member; a driving member configured to supply a driving force to said oscillation system based on a driving signal; and a driving frequency control unit configured to control a driving frequency of a driving signal to be outputted to said driving member; wherein, when an oscillation frequency of said oscillator is to be changed from a current oscillation frequency to a target oscillation frequency, said driving frequency control unit temporarily outputs, to said driving member, a driving signal having a driving frequency which is made different from the target oscillation frequency, being changed from the current driving frequency and beyond the target oscillation frequency, thereby to cause said driving member to drive said oscillation system.

The driving frequency control unit may temporarily output, to said driving member, a driving signal having a driving frequency which has resulted from applying, to the current oscillation frequency, a frequency change larger than an absolute value of the difference between the current oscillation frequency and the target oscillation frequency, thereby to cause said driving member to drive said oscillation system.

The oscillator device may further comprise detecting means configured to detect an oscillation frequency of said oscillator, wherein, after the driving signal is changed into a driving signal having a driving frequency different from the target oscillation frequency and until a change of the oscillation frequency of said oscillator detected by said detecting means satisfies a predetermined condition, said driving frequency control unit may temporarily output, to said driving member, a driving signal of the driving frequency different from the target oscillation frequency, and wherein, afterwards, said driving frequency control unit outputs, to said driving member, a driving signal of a driving frequency equal to the target oscillation frequency, thereby to cause said driving member to drive said oscillation system.

The driving frequency control unit may output, to said driving member for a predetermined time, a driving signal of a driving frequency different from the target oscillation frequency, and afterwards, said driving frequency control unit may output, to said driving member, a driving signal having a driving frequency equal to the target oscillation frequency, thereby to cause said driving member to drive said oscillation system.

The driving frequency control unit may determine at least one of a temporary changing amount of the frequency of the driving signal and said predetermined time, based on a characteristic of said oscillation system.

The driving frequency control unit may determine at least one of the temporary changing amount of the frequency of the driving signal and said predetermined time based on the difference between the resonance frequency of said oscillation system and the target oscillation frequency.

The oscillation system may include a plurality of oscillators and a plurality of resilient supporting members, wherein a resonance frequency thereof may have a fundamental frequency of fundamental wave and an n-fold frequency which is approximately n-fold the fundamental frequency, where n is an integer not less than 2, wherein said driving frequency control unit may output, to said driving member, a driving signal having driving frequency components in a ratio of 1:n corresponding to the fundamental wave and the n-fold wave, respectively, to cause said driving member to drive said oscillation system, wherein, when the oscillation frequency of said oscillator of said oscillation system which is activated with a driving signal of the driving frequency component corresponding to the fundamental wave is changed from the current oscillation frequency to the target oscillation frequency, said driving frequency control unit may temporarily output, to said driving member, a driving signal having a driving frequency component corresponding to the fundamental wave and made different from the target oscillation frequency, being changed from the driving frequency corresponding to the current fundamental wave and beyond the target oscillation frequency, thereby to cause said driving member to drive said oscillation system.

In accordance with another aspect of the present invention, there is provided an optical deflection device including an oscillator device as recited above, wherein at least one of said oscillators is provided with an optical deflecting element configured to deflect a light beam incident thereon.

In accordance with a further aspect of the present invention, there is provided a driving method for an oscillation system of an oscillator device, the oscillator device including the oscillation system with an oscillator and a resilient supporting member, and a driving member configured to supply a driving force to the oscillation system based on a driving signal, wherein, when an oscillation frequency of the oscillator is to be changed from a current oscillation frequency to a target oscillation frequency, a driving signal having a driving frequency made different from the target oscillation frequency, being changed from the current driving frequency and beyond the target oscillation frequency, is temporarily outputted to the driving member, thereby to cause the driving member to drive the oscillation system.

In accordance with the present invention, the driving frequency of the driving signal is temporarily changed beyond the target oscillation frequency mentioned above, such that the time required for changing the oscillation frequency of the oscillator of the oscillation system can be shortened.

These and other objects, features and advantages of the present invention will become more apparent upon a consideration of the following description of the preferred embodiments of the present invention taken in conjunction with the accompanying drawings.

DESCRIPTION OF THE PREFERRED EMBODIMENTS

Preferred embodiments of the present invention will now be described with reference to the attached drawings.

First Embodiment

Figure 1:
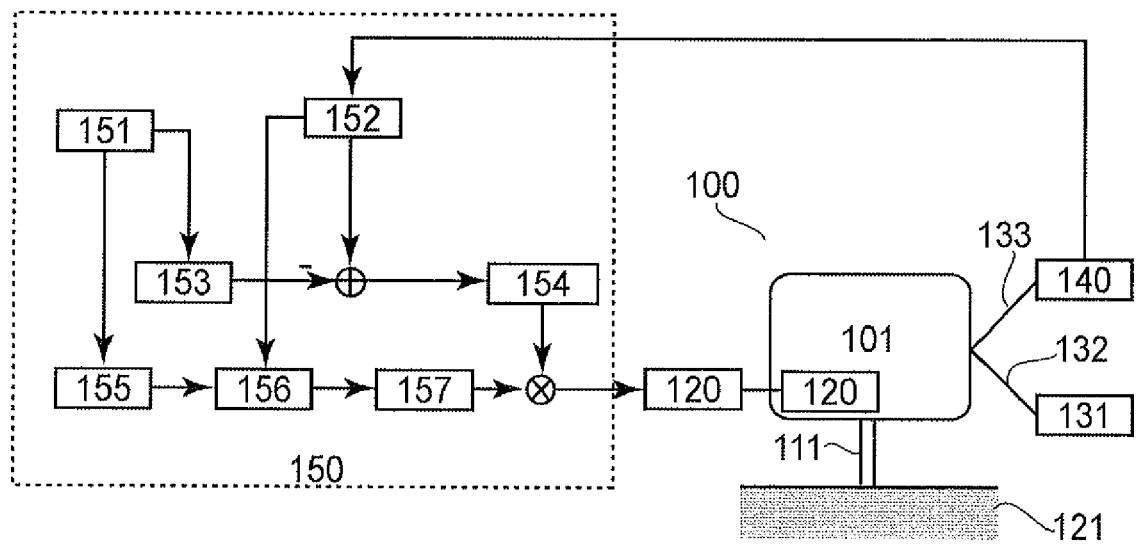
FIG. 1 is a schematic diagram of an optical deflecting device according to a first embodiment of the present invention.

FIG. 1 is a schematic diagram of a first embodiment, when the present invention is applied to an optical deflecting device. In this embodiment, an optical deflecting member (optical scanner) comprises an oscillation system including one oscillator 101 and a torsion spring (resilient supporting member) 111, and a supporting member 121 for supporting the oscillation system 100. A driving member 120 receives a driving signal and, in response, it supplies a driving force to the oscillation system 100 based on an electromagnetic system, an electrostatic system or a piezoelectric system, for example.

In the case of the electromagnetic driving, as an example, a permanent magnet may be provided on the oscillator, and an electric coil for applying a magnetic field to this permanent magnet may be disposed close to the oscillator. The disposition of the permanent magnet and the electric coil may be reversed.

In the case of the electrostatic driving, an electrode may be formed on the oscillator, and an electrode which functions to apply an electrostatic force in between it and this electrode may be formed close to the oscillator.

In the case of the piezoelectric driving, a piezoelectric element may be provided on the oscillation system or a fixed supporting member of the oscillation system, and a driving force may be applied thereby.

The oscillator 101 has an optical deflection element such as a reflecting mirror on the surface thereof, for deflectively reflecting a light beam 132 from a light source 131 to scan the same. The scanning light 133 passes a light receiving element (detecting means) 140 twice during a single scan period. A control unit 150 generates a driving signal based on the time when the scanning light 133 passes the light receiving element 140, and this driving signal is outputted to the driving member 120.

Figure 2:
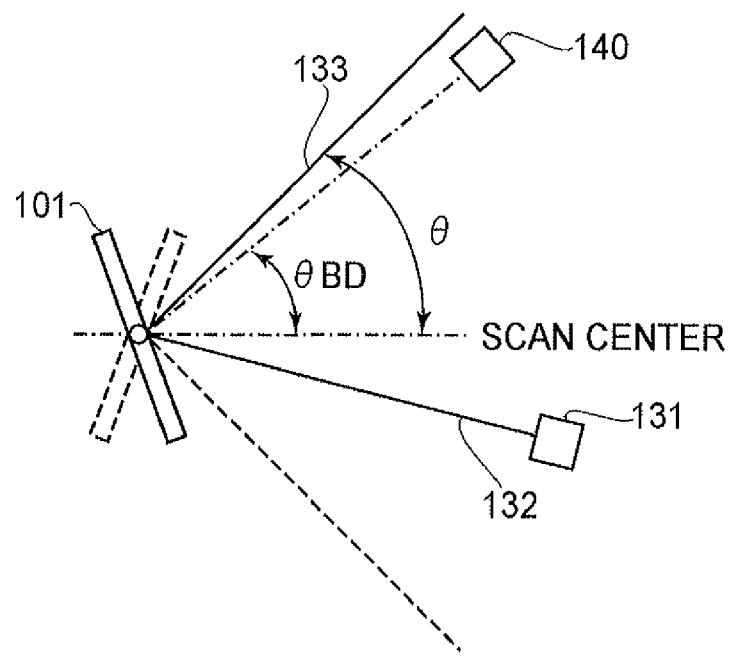
FIG. 2 is a diagram illustrating the deflection angle of scanning light in the optical deflecting device of the first embodiment.

FIG. 2 illustrates the deflection angle of the scanning light 133 by the reflecting mirror of the oscillator 101 of the optical deflecting device. The light receiving element 140 of the optical scanner is disposed at a position (position of the set angle θBD) whereat it can receive the scanning light 133 having a deflection angle is smaller than the maximum deflection angle of the optical scanner. Although in FIG. 2 the light receiving element 140 is disposed at the light path of the optical scanner, the light receiving element 140 may be disposed at a light path of the scanning light being further deflected by a separate reflecting mirror.

The structure and operation of the control unit 150 will be described in greater detail.

Figure 3:
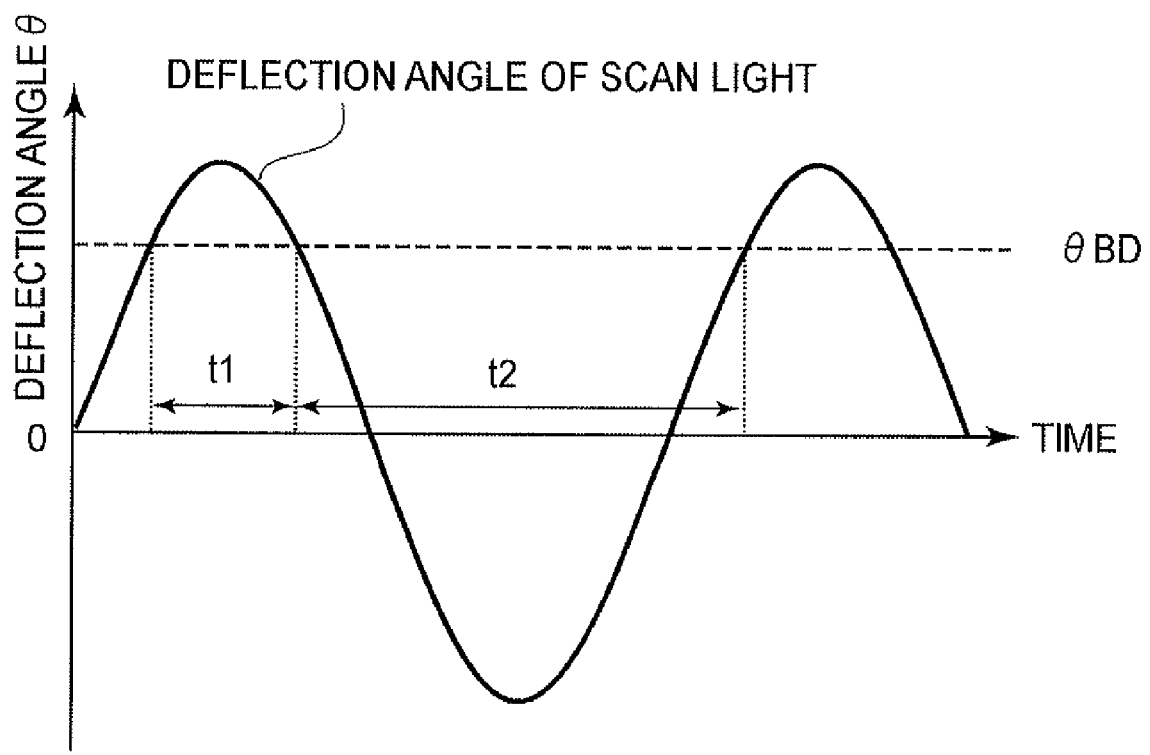
FIG. 3 is a diagram illustrating a change with respect to time of the deflection angle of the scanning light of the optical deflecting device.

A measuring member 152 takes the output signal of the light receiving element 140 and measures time t1 and time t2 for the detection time moment of the scanning light 133. FIG. 3 shows changes with respect to time of the deflection angle θ of the scanning light 133 by the optical scanner as well as the aforementioned time t1 and time t2 related to the time moments whereat the scanning light 133 passes the set angle θBD of the setting position of the light receiving element 140. Times t1 and t2 can be discriminated in the manner that one in which the time of the detection time moment is not greater than a half period of the driving signal is taken as t1, while another is taken as t2. The change with respect to time of the deflection angle θ of the scanning light 133 corresponds to the oscillation state that the oscillator 101 oscillates at a certain oscillation frequency.

Based on the difference Δt1 between the detection time t1 shown in FIG. 3 and the target time 153 set by the controller 151, the driving amplitude control unit 154 controls the amplitude of a driving signal to be outputted to the driving member 120. On the other hand, based on the detection time t1 and time t2 outputted from the time measuring member 152, the driving frequency control unit 156 detects the current oscillation frequency of the oscillator 101. Then, based on the detected current oscillation frequency and the target oscillation frequency 155 set by the controller 151, the driving frequency of the driving signal is set. A waveform generator 157 generates a waveform of the driving frequency set by the driving frequency control unit 156. Here, since one amplitude and one frequency of the driving signals should be determined based on the output of the time measuring member 152 as described above, the detecting means may be so configured that one light receiving element 140 is provided to measure the detection times t1 and t2.

Figure 4:
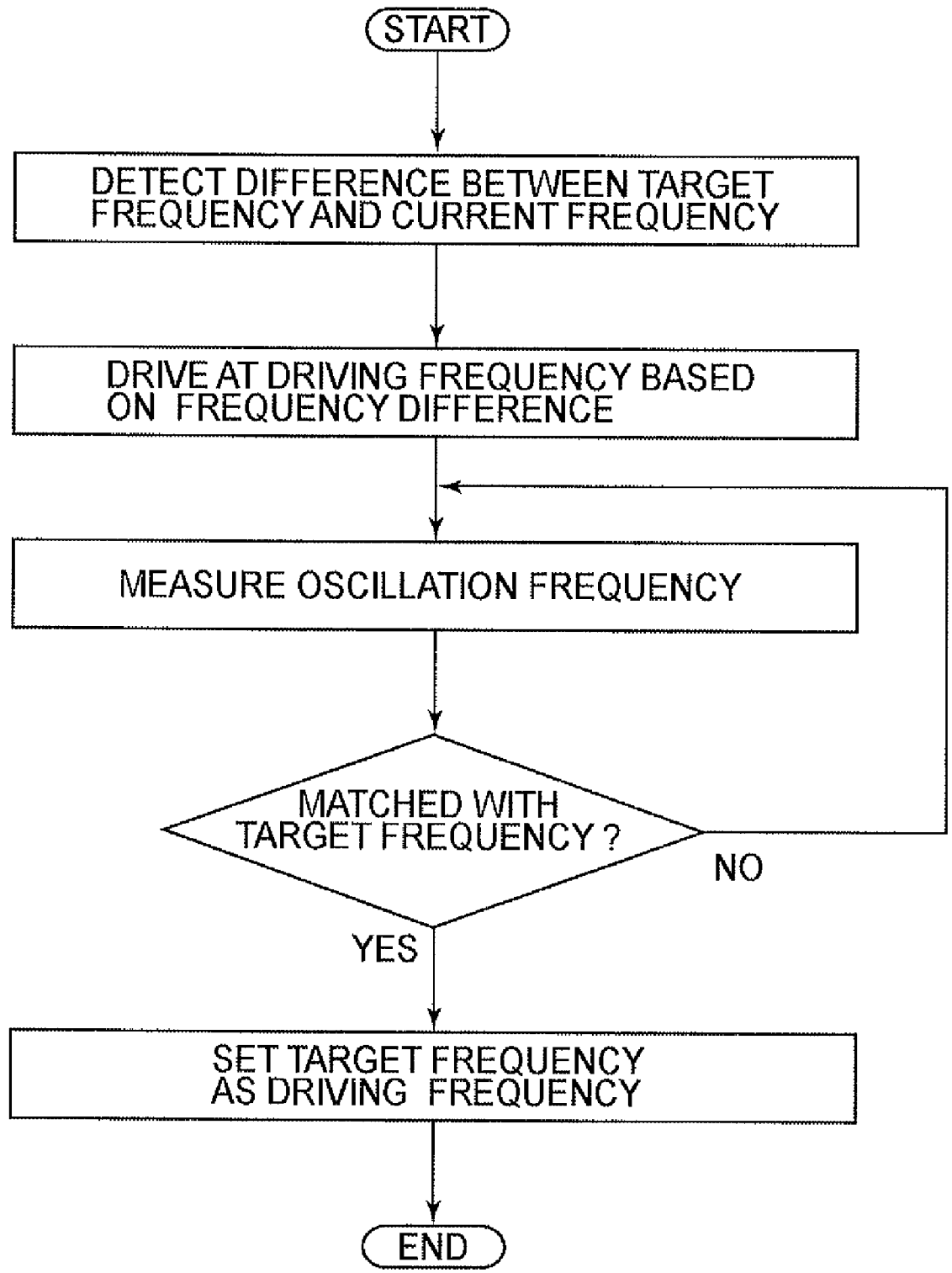
FIG. 4 is a diagram illustrating the operation flow of the first embodiment.
Figure 5:
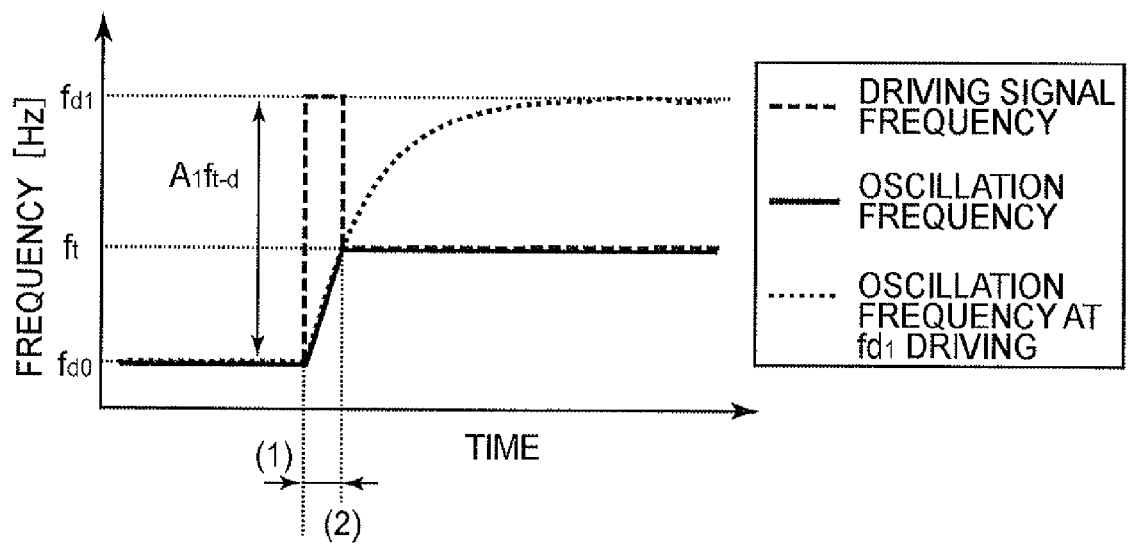
FIG. 5 is a diagram illustrating a change with respect to time of the frequency in the first embodiment.

FIG. 4 is an operation flow chart illustrating the procedure of operation steps of the driving frequency control unit 156 in the present embodiment. FIG. 5 shows changes of the driving frequency of the driving signal and the oscillation frequency of the oscillator 101, with respect to time, in the present embodiment. The operation flow and changes with respect to time of the oscillation frequency will be described below.

When, in an oscillation state of the oscillator 101 that the scanning light 133 passes through the light receiving element 140 normally, a target oscillation frequency $f_t$155 is set by the controller 151, the driving frequency control unit 156 operates to detect the difference $f_{t-d}$ between it and the current driving frequency $f_{d0}$. Subsequently, based on the thus detected difference, the frequency $f_{d1}$ of the driving signal is determined using equation (1) below, and the frequency $f_{d1}$ of the driving signal is set inside the waveform generator 157. In this manner, a driving signal having a driving frequency which is temporarily made different from the target oscillation frequency, having been changed from the current driving frequency beyond the target oscillation frequency, is outputted to the driving member 120 to cause the same to drive the oscillation system 100.

$$f_{d1}=f_{d0}+A_1 f_{t-d} \quad (1)$$

Here, as shown in FIG. 5, $A_1$ should preferably have a positive value larger than 1. From the results of experiments, it has been found that a value around 2 to 3 is preferable. Furthermore, $A_1$ may be changed in accordance with parameters such as the Q-value of the oscillation system 100 or differences of $f_t$ and $f_{d0}$ from the resonance frequency of the oscillation system 100. Alternatively, $A_1$ may be determined using a function or a table based on these parameters. Generally, the larger the Q-value is, the larger the set value of $A_1$ is. Furthermore, the closer the $f_t$ and $f_{d0}$ to the resonance frequency are, the larger the set value of $A_1$ is. As described above, in the present embodiment, based on the characteristics such as the Q-value of the oscillation system, for example, the driving frequency control unit 156 can determine the temporary changing amount of the frequency of the driving signal. Furthermore, the temporary changing amount of the frequency of the driving signal may be determined based on the difference between resonance frequency of the oscillation system and the target oscillation frequency.

The value to be set in the driving frequency control unit 156 may be based on the difference $f_{t-d}$ between the target oscillation frequency $f_t$ and the current driving frequency $f_{d0}$. In that occasion, the driving frequency control unit 156 determines in response to this the $f_{d1}$ in accordance with equation (1) above. In the manner described above, the driving frequency control unit 156 of the present embodiment temporarily outputs, to the driving member 120, a driving signal having a driving frequency which has resulted from applying, to the current oscillation frequency, a frequency change larger than the absolute value of the difference between the current oscillation frequency and the target oscillation frequency, thereby to drive the oscillation system 100. It should be noted here that, although in the explanation using FIG. 5 the current driving frequency is lower than the target oscillation frequency, even if the current driving frequency is higher than the target oscillation frequency, the driving frequency can be similarly temporarily changed. In that occasion, a driving signal having a driving frequency which is made different from the target oscillation frequency, having been changed from the current driving frequency downwardly beyond the target oscillation frequency may be outputted to the driving member 120. In terms of equation (1) above, the difference $f_{t-d}$ has a negative value.

In this embodiment, the driving frequency control unit 156 further detects the current oscillation frequency $f_n$ during the driving at the driving signal frequency $f_{d1}$ for (the time period (1) in FIG. 5), and comparison of the same with the target oscillation frequency $f_t$155 is carried out. If, as a result of the comparison, the current oscillation frequency $f_n$ matches the target oscillation frequency $f_t$155 (the time moment (2) in FIG. 5), the driving frequency is changed to the driving signal frequency $f_{d2}$ which is equal to the target oscillation frequency $f_t$155, such as shown in equation (2) below.

$$f_{d2}=f_t \quad (2)$$

In this manner, based on the detected current oscillation frequency and the target oscillation frequency 155 set by the controller 151, the driving frequency control unit 156 sets the driving frequency of the driving signal. Then, the waveform generator 157 generates a waveform of the driving frequency set by the driving frequency control unit 156, and the driving at the driving signal frequency $f_{d2}$ is carried out. In other words, the oscillator device is provided with detecting means (including the light receiving element 14 and the time measuring member 152, and so on) for detecting the oscillation frequency of the oscillator 101, and the driving frequency control unit 156 is configured to operate, after changing the driving signal into one having a driving frequency different from the target oscillation frequency, as follows. Namely, until the change of the oscillation frequency of the oscillator 101 detected by the detecting means satisfies a predetermined condition, the driving frequency control unit temporarily outputs, to the driving member, a driving signal having a driving frequency made different from the target oscillation frequency. Then, afterwards, it outputs a driving signal having a driving frequency equal to the target oscillation frequency to the driving member 120, and to cause the same to drive the oscillation system 100.

In this embodiment, the time in which the driving frequency being change beyond the target oscillation frequency is produced (i.e., the time period until the predetermined condition is satisfied) is up to the moment whereat the current oscillation frequency $f_n$ and the target oscillation frequency $f_t$155 match. However, it is not always necessary to set the time up to the moment where these frequencies match. At a time moment where these frequencies do not match, the driving frequency may be taken as $f_t$. When the current oscillation frequency $f_n$ satisfies a certain discrimination condition, such as, for example, at a time moment when the current oscillation frequency $f_n$ enters a range of $f_t$ with a necessary frequency precision, the driving frequency may be taken as $f_t$.

Furthermore, the change of the frequency of the driving signal is not necessarily limited to one time. It may be changed several times during the time interval until the oscillation frequency of the oscillator becomes equal to the target oscillation frequency $f_t$155. For example, each time $|f_n-f_{t1}|$ reaches a predetermined value, the frequency of the driving signal may be changed in accordance with equation (1), and the driving may be finally made with the driving signal frequency $f_{d2}$ corresponding to the target oscillation frequency $f_t$155. In this case, the magnitude of $A_1$ in equation (1) at the time of the change may be switched.

Furthermore, although in this embodiment the oscillation frequency of the oscillator 101 is detected by using the scanning light 133 and the light receiving element 140, any other detecting element such as a piezoelectric element which can detect the oscillation frequency may be used. For example, a piezo-sensor may be provided on the resilient supporting member 111, or an electro-capacitance sensor or a magnetic sensor may be used.

As described hereinbefore, the optical deflecting device of the present embodiment comprises an oscillator device including an oscillation system of the aforementioned structure, wherein an optical deflection element is disposed on one oscillator to deflect a light beam incident on this optical deflection element.

Furthermore, a method of driving the oscillator device of the present embodiment which includes an oscillation system having an oscillator and a resilient supporting member, and a driving member for supplying a driving force to the oscillation system based on a driving signal, may comprise the following step. That is, when the oscillation frequency of the oscillator is to be changed from a current oscillation frequency to a target oscillation frequency, a driving signal having a driving frequency made different from the target oscillation frequency, being changed from the current driving frequency and beyond the target oscillation frequency, is temporarily outputted to the driving member, to cause the same to drive the oscillation system.

In the present embodiment described above, by making the value of $A_1$ larger than 1, the change of the oscillation frequency of the oscillator 101 can be accelerated, and thus, the time until the target oscillation frequency is reached can be shortened. The oscillation system of the present embodiment can be made an oscillation system of MEMS (Micro-Electro-Mechanical-System) having a relatively high Q-value. In such oscillation system, the method in which the driving frequency of the driving signal is changed to control the oscillation frequency toward the target oscillation frequency as described hereinbefore is quite a unique concept as compared with the conventional methods.

Second Embodiment

Figure 6:
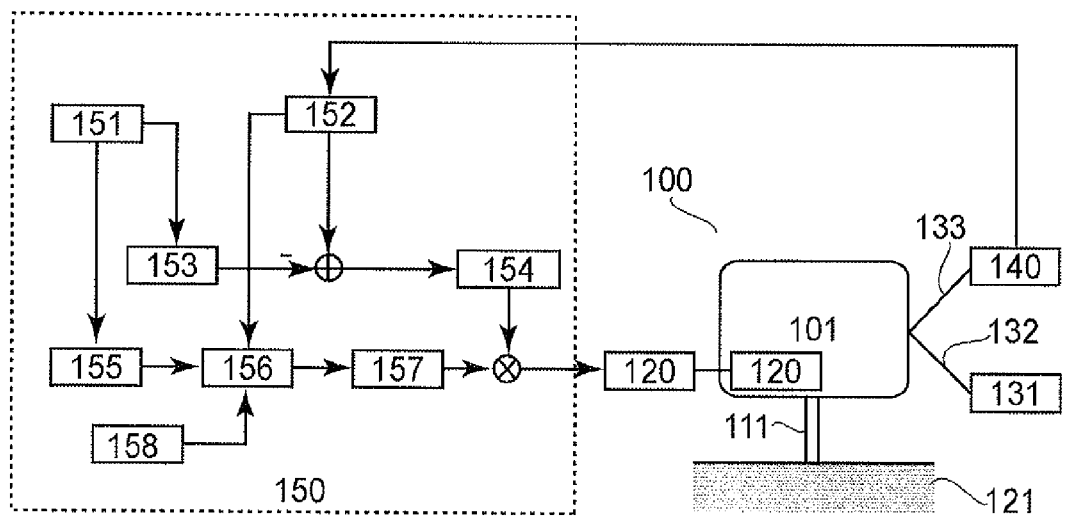
FIG. 6 is a schematic diagram of an optical deflecting device according to a second embodiment of the present invention.

FIG. 6 is a schematic diagram of a second embodiment, when the present invention is applied to an optical deflecting device. Changes of the deflection angle of the scanning light in the optical deflecting device of the present embodiment, as well as the method of detecting detection times t1 and t2 using the light receiving element 140 and the time measuring member 152 and the operation of the driving amplitude control unit 154, are similar to that having been described with reference to the first embodiment. The present embodiment differs from the first embodiment in that the driving frequency control unit 156 operates to change the driving frequency temporarily only for a fixed predetermined time based on a signal of the measurement time from a timer 158, not based on the signal from the time measuring member 152. As a matter of course, this fixed time can be changed.

In the present embodiment as well, the driving frequency control unit 156 detects the current oscillation frequency of the oscillator 101 based on the detection time intervals t1 and t2 outputted from the time measuring member 152. Then, based on the detected current oscillation frequency and the target oscillation frequency 155 set by the controller 151, the driving frequency of the driving signal is set. A waveform generator 157 generates a waveform of the driving frequency set by the driving frequency control unit 156.

Figure 7:
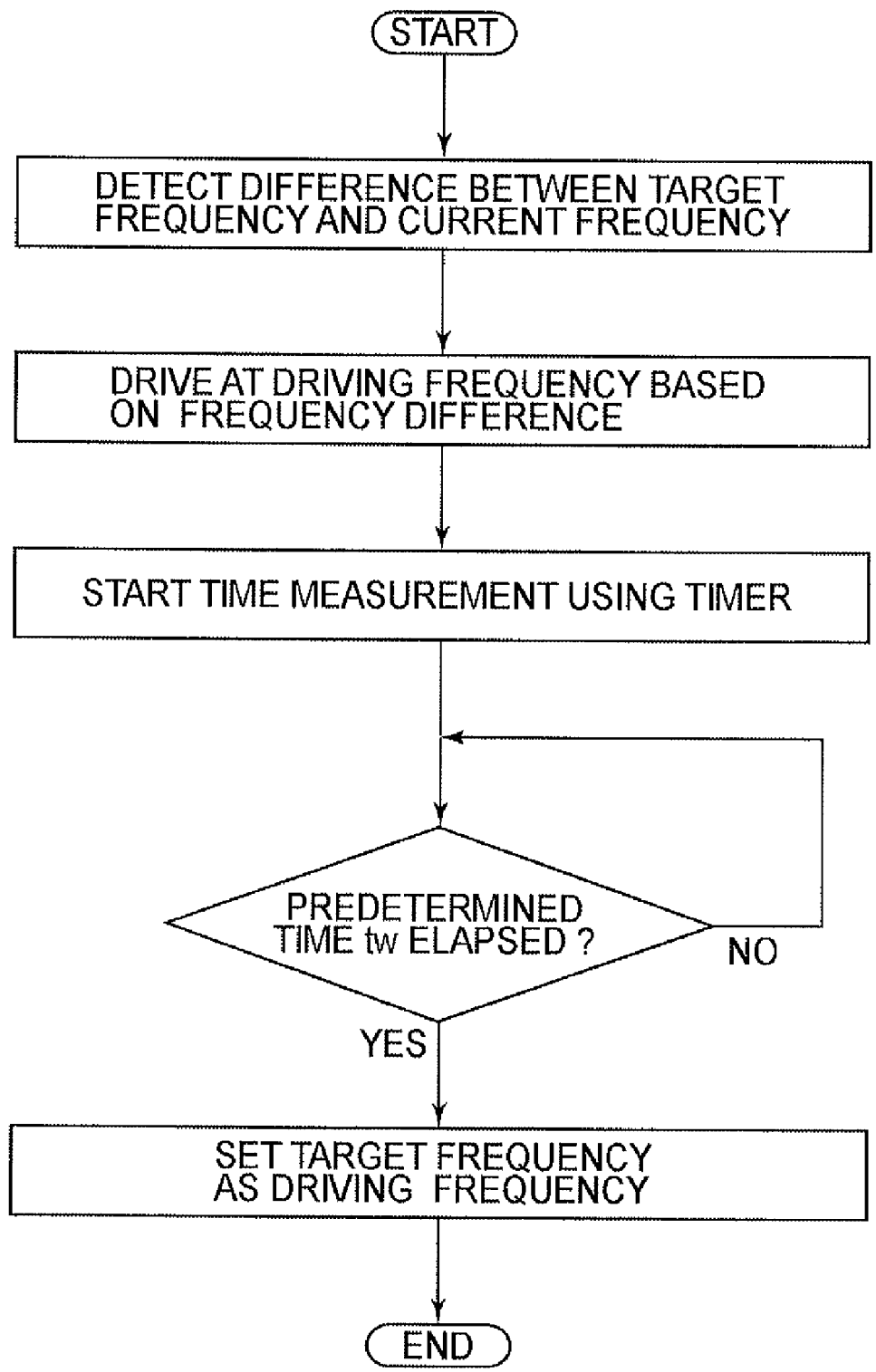
FIG. 7 is a diagram illustrating the operation flow of the second embodiment.
Figure 8:
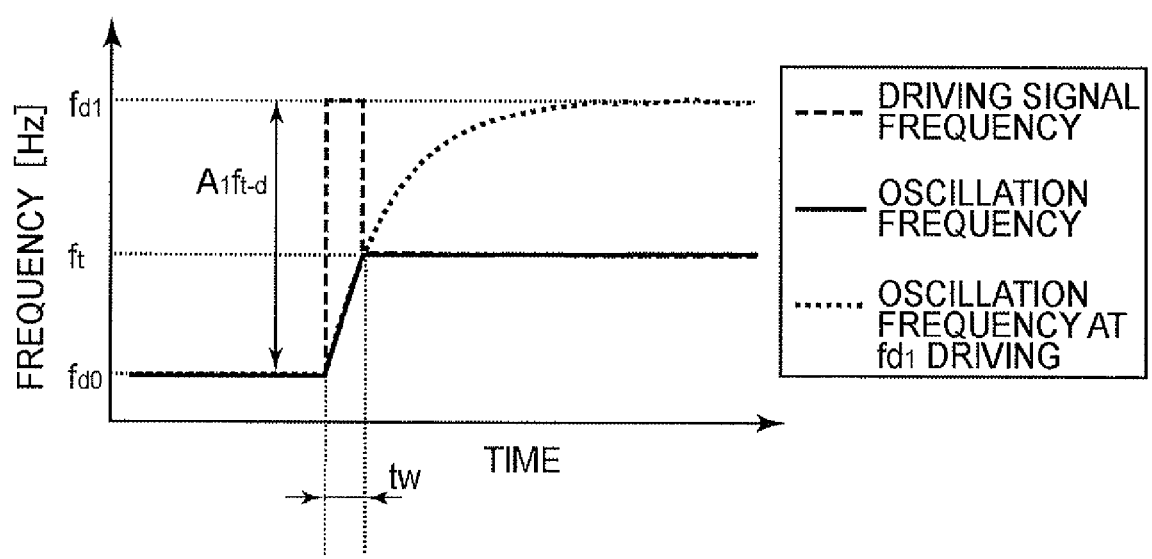
FIG. 8 is a diagram illustrating a change with respect to time of the frequency in the second embodiment.

FIG. 7 is a flow chart illustrating details of the above-described operation of the driving frequency control unit 156 and the timer 158 in the present embodiment. FIG. 8 shows changes of the driving frequency and the oscillation frequency with respect to time, in the present embodiment.

When, in an oscillation state of the oscillator 101 that the scanning light 133 passes through the light receiving element 140 normally, a target oscillation frequency $f_t$155 is set by the controller 151, the driving frequency control unit 156 operates to detect the difference $f_{t-d}$ between it and the detected current driving frequency $f_{d0}$. Then, based on the detected difference, the frequency $f_{d1}$ of the driving signal is determined in accordance with equation (1), and the frequency $f_{d1}$ of the driving signal is set within the waveform generator 157. Here, $A_1$ should desirably have a positive value larger than 1, and this is just the same as in the first embodiment.

In this embodiment, the timer 158 measures the time after the driving at the driving signal frequency $f_{d1}$ is started. When a predetermined time $t_w$ elapses, it outputs a signal to the driving frequency control unit 156. When the driving frequency control unit 156 detects the signal from the timer 158, it operates to perform the driving at a driving signal frequency $f_{d2}$ equal to the target oscillation frequency $f_t$ as shown in equation (2).

Here, the predetermined time $t_w$ corresponds to the time required for that, when the driving based on the driving signal of a driving frequency $f_{d1}$ determined by a certain $A_1$ is carried out, the frequency changes from the driving frequency $f_{d0}$ to the target oscillation frequency $f_t$.

Here, the time $t_w$ is measured beforehand, and it is stored into a table. The time $t_w$ may not be measured beforehand but it may be detected by using a certain function based on some characteristics such as the Q-value of oscillation system 100, for example. Furthermore, it may be changed by a parameter such as the difference of the Q-value, $f_t$ or $f_{d0}$ of the oscillation system with respect to the resonance frequency. In the present embodiment, as described above, the driving frequency control unit 156 can determine at least one of the temporary changing amount (as set by $A_1$) of the frequency of the driving signal and the aforementioned predetermined time, based on the characteristic of the oscillation system 100. Furthermore, based on the differences between the resonance frequency and the target oscillation frequency of the oscillation system 100, it may determine at least one of the temporary changing amount (as set by $A_1$) of the frequency of the driving signal and the predetermined time.

The driving frequency control unit of the present embodiment described hereinbefore outputs, for a predetermined time, a driving signal having a driving frequency different from the target oscillation frequency to the driving member 120. Afterwards, it outputs a driving signal of a driving frequency equal to the target oscillation frequency to the driving member 120, to cause the same to drive the oscillation system 100.

In the present embodiment as well, the change of the frequency of the driving signal is not necessarily be limited to a single time. It may be changed several times until the oscillation frequency of the oscillator reaches the target oscillation frequency $f_t$ 155.

In this embodiment as well, by making the value of $A_1$ larger than 1, the change of the oscillation frequency of the oscillator 101 can be accelerated, and the time until the target oscillation frequency is reached can be shortened.

Third Embodiment

Figure 9:
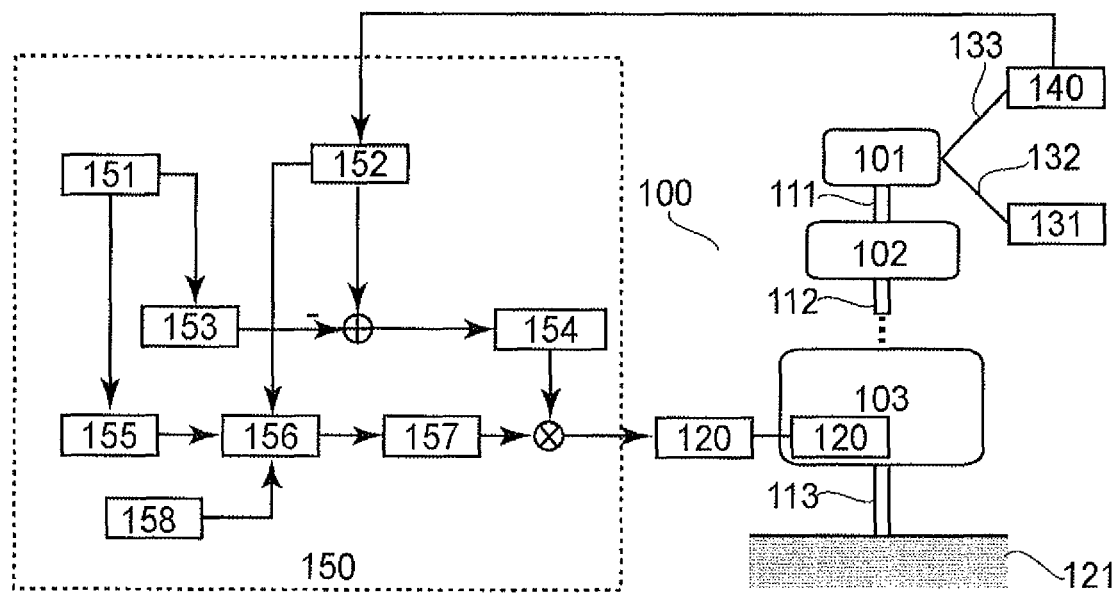
FIG. 9 is a schematic diagram of an optical deflecting device according to a third embodiment of the present invention.

FIG. 9 is a schematic diagram of a third embodiment, when the present invention is applied to an optical deflecting device. In this embodiment, an optical deflection member (optical scanner) comprises an oscillation system 100 which includes at least a first oscillator 101, a second oscillator 102, a first torsion spring 111 and a second torsion spring 112, as well as a supporting member 121 for supporting the oscillation system 100. The first torsion spring 111 which is a resilient supporting member connects the first oscillator 101 and the second oscillator 102 each other. The second torsion spring 112 which is a resilient supporting member is connected to the second oscillator 102, so that it has a torsion axis aligned with the torsion axis of the first torsion spring 111. the oscillation system 100 of the present embodiment should comprise at least two oscillators and two torsion springs. As shown in FIG. 9, the oscillation system may be comprised of three or more oscillators and three or more torsion springs.

In this embodiment, the first oscillator 101 has a reflecting mirror formed on the surface thereof, and a light beam 132 from a light source 131 is scanned thereby. The function of the driving member 120 and the operation of the control unit 150 are basically the same as that of the second embodiment.

Figure 10:
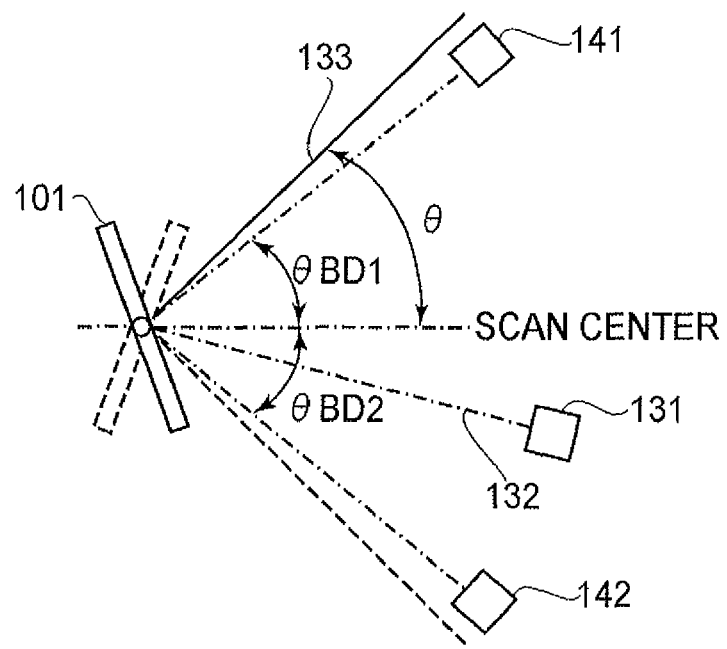
FIG. 10 is a diagram illustrating the deflection angle of scanning light of the optical deflecting device in the third embodiment.

FIG. 10 illustrates the deflection angle of the scanning light 133 by the reflecting mirror of the first oscillator 101 of the optical deflecting device. The optical scanner includes first and second light receiving elements 141 and 142 which are disposed at positions (positions of the set angle θBD1 and set angle θBD2) where they can receive the scanning light 133 of a deflection angle smaller than the maximum deflection angle of the optical scanner. In this embodiment as well, the first and second light receiving elements 141 and 142 are disposed on the light path of the optical scanner in FIG. 10. However, the first and second light receiving elements 141 and 142 may be disposed on a light path of the scanning light deflected furthermore by a separate reflecting mirror. In this example, since two amplitudes and phases and one frequency of the driving signal have to be determined based on the output of the time measuring member 152, the structure should be such that two light receiving elements 140 are provided to enable measurement of detection times of a number lager than the detection times obtainable with the second embodiment.

In this embodiment, the oscillation system 100 is so configured to simultaneously generate a first oscillating motion activated by a fundamental wave which is the fundamental frequency, and a second oscillating motion activated by an n-fold wave which is a frequency approximately n-fold the fundamental frequency. Namely, the deflection angle θ of the scanning light of the optical deflecting device of the present embodiment is as follows. When the amplitude, frequency (angular frequency) and phase of the first oscillating motion are denoted by $B_1$, $\omega_1$ and $\phi_1$, respectively, the amplitude, frequency (angular frequency) and phase of the second oscillating motion are denoted by $B_2$, $\omega_2$ and $\phi_2$, respectively, and the time with respect to an appropriate time chosen as an origin or a reference time is denoted by t, it can be expressed as equation (3) below. Since the oscillation state of the first oscillator 101 and the deflection angle θ of the scanning light correspond to each other in a one-to-one relation, the oscillation state of the first oscillator 101 as well can be substantially expressed using this equation.

$$\theta(t)=B_1 \sin(\omega_1 t+\phi_1)+B_2 \sin(\omega_2 t+\phi_2) \quad (3)$$

In order to realize such oscillation state of the first oscillator 101, the oscillation system 100 is so driven that the driving signal for the oscillator device having two natural oscillation modes according to the present embodiment enables driving the first oscillator 101 to produce oscillation as expressed by the aforementioned equation including two sinusoidal wave terms. Any driving signal may be used provided that it drives the first oscillator 101 to assure such oscillation state. For example, a driving signal provided by synthesizing the fundamental wave and the n-fold sinusoidal wave may be used. Alternatively, even a pulse-like driving signal may be used. In that occasion, a desired driving signal can be obtained by adjusting the amplitude and phase of each sinusoidal wave. If a pulse-like signal is used to perform the driving, a desired driving signal can be generated by changing the number, spacing or width of the pulses with respect to time. Here, once the driving frequency of the fundamental wave of the driving signal is determined, the driving frequency of the n-fold wave of the driving signal is automatically determined by n-folding the driving frequency of the fundamental wave. As a result, the two amplitudes and phases and one frequency of the driving signal should be determined as described above and, to this end, the first and second light receiving elements 141 and 142 are provided. It is to be noted here that, in this embodiment, approximately an integer-fold refers to a case where, when the frequency of the fundamental wave is $f_1$ and the frequency of the n-fold wave is $f_2$, a relationship of $$0.98N \leq f_2/f_1 \leq 1.02N$$

where N is an integer not less than 2 is satisfied.

In this embodiment, the oscillation frequency in the second embodiment refers to an oscillation frequency ($\omega_1$ in equation (3)) of the first oscillation motion of the first oscillator 101 activated by a fundamental wave, and the driving frequency refers to a driving frequency corresponding to the frequency of the fundamental wave of the driving signal. The oscillation frequency corresponding to the fundamental wave is detected from the detection time measured by the time measuring member 152, and based on this and on the target oscillation frequency $f_t$ 155, the driving frequency corresponding to the fundamental frequency of the driving signal is controlled. If the oscillation frequency and the driving frequency of the second embodiment are replaced by these frequencies, the explanation having been made with reference to the second embodiment applies as the explanation of the operation of the present embodiment.

Hence, in this embodiment, based on the difference between the detection time measured by the time measuring member 152 and the target time 153 set by the controller 151, the driving amplitude control unit 154 controls the fundamental wave of the driving signal and the amplitude and phase of the n-fold of wave so that the scanning light traces a predetermined locus.

The operation flow of the driving frequency control unit 156 and the timer 158 of the present embodiment as well as the changes of the driving frequency and the oscillation frequency with respect to time are similar to that having been described with reference to FIG. 7 and FIG. 8 in the second embodiment.

As has been described above, in the present embodiment, the oscillation system 100 includes a plurality of oscillators and a plurality of resilient supporting members, and the resonance frequency thereof has a fundamental frequency of the fundamental wave and an n-fold frequency of n-fold wavy, which is approximately n-fold the fundamental frequency, wherein n is an integer not less than 2. Then, the driving frequency control unit 156 outputs, to the driving member 120, a driving signal having driving frequency components in the ratio of 1:n, corresponding to the fundamental wave and n-fold wave, respectively, thereby to cause the driving member 120 to drive the oscillation system 100.

Furthermore, when the oscillation frequency of the oscillator 101 of the oscillation system activated with the driving signal of the driving frequency component corresponding to the fundamental wave is going to be changed from a current oscillation frequency to a target oscillation frequency, the driving frequency control unit 156 temporarily as follows. Namely, it operates to output, to the driving member 120, a driving signal having a driving frequency component corresponding to the fundamental wave different from the target oscillation frequency, being changed from the driving frequency corresponding to the current fundamental wave and beyond the target oscillation frequency, thereby to cause the driving member 120 to drive the oscillation system 100.

Although this embodiment has been described with reference to a structure in which, in an oscillation system having a plurality of oscillators and a plurality of torsion springs, a timer 158 is used like the second embodiment, the oscillation frequency of the first oscillator 101 may be detected as in the first embodiment.

In this embodiment as well, by making the value of $A_1$ larger than 1, the change of the oscillation frequency of the oscillator 101 can be accelerated, and the time until the target oscillation frequency is reached can be shortened.

While the invention has been described with reference to the structures disclosed herein, it is not confined to the details set forth and this application is intended to cover such modifications or changes as may come within the purposes of the improvements or the scope of the following claims.

This application claims priority from Japanese Patent Application No. 2008-031195 filed Feb. 13, 2008, for which is hereby incorporated by reference.

What is claimed is:

1. An oscillator device, comprising:
   an oscillation system including an oscillator and a resilient supporting member;
   a driving member configured to supply a driving force to said oscillation system based on a driving signal; and
   a driving frequency control unit configured to control a driving frequency of a driving signal to be outputted to said driving member;
   wherein, when an oscillation frequency of said oscillator is to be changed from a current oscillation frequency to a target oscillation frequency, said driving frequency control unit temporarily outputs, to said driving member, a driving signal having a driving frequency which is made different from the target oscillation frequency, being changed from the current driving frequency and beyond the target oscillation frequency, thereby to cause said driving member to drive said oscillation system.

2. An oscillator device according to claim 1, wherein said driving frequency control unit temporarily outputs, to said driving member, a driving signal having a driving frequency which has resulted from applying, to the current oscillation frequency, a frequency change larger than an absolute value of the difference between the current oscillation frequency and the target oscillation frequency, thereby to cause said driving member to drive said oscillation system.

3. An oscillator device according to claim 1, further comprising detecting means configured to detect an oscillation frequency of said oscillator, wherein, after the driving signal is changed into a driving signal having a driving frequency different from the target oscillation frequency and until a change of the oscillation frequency of said oscillator detected by said detecting means satisfies a predetermined condition, said driving frequency control unit temporarily outputs, to said driving member, a driving signal of the driving frequency different from the target oscillation frequency, and wherein, afterwards, said driving frequency control unit outputs, to said driving member, a driving signal of a driving frequency equal to the target oscillation frequency, thereby to cause said driving member to drive said oscillation system.

4. An oscillator device according to claim 1, wherein said driving frequency control unit outputs, to said driving member for a predetermined time, a driving signal of a driving frequency different from the target oscillation frequency, and afterwards, said driving frequency control unit outputs, to said driving member, a driving signal having a driving frequency equal to the target oscillation frequency, thereby to cause said driving member to drive said oscillation system.

5. An oscillator device according to claim 3, wherein said driving frequency control unit determines at least one of a temporary changing amount of the frequency of the driving signal and said predetermined time, based on a characteristic of said oscillation system.

6. An oscillator device according to claim 1, wherein said driving frequency control unit determines at least one of the temporary changing amount of the frequency of the driving signal and said predetermined time based on the difference between the resonance frequency of said oscillation system and the target oscillation frequency.

7. An oscillator device according to claim 1, wherein said oscillation system includes a plurality of oscillators and a plurality of resilient supporting members, wherein a resonance frequency thereof has a fundamental frequency of fundamental wave and an n-fold frequency which is approximately n-fold the fundamental frequency, where n is an integer not less than 2, wherein said driving frequency control unit outputs, to said driving member, a driving signal having driving frequency components in a ratio of 1:n corresponding to the fundamental wave and the n-fold wave, respectively, to cause said driving member to drive said oscillation system, wherein, when the oscillation frequency of said oscillator of said oscillation system which is activated with a driving signal of the driving frequency component corresponding to the fundamental wave is changed from the current oscillation frequency to the target oscillation frequency, said driving frequency control unit temporarily outputs, to said driving member, a driving signal having a driving frequency component corresponding to the fundamental wave and made different from the target oscillation frequency, being changed from the driving frequency corresponding to the current fundamental wave and beyond the target oscillation frequency, thereby to cause said driving member to drive said oscillation system.

8. An optical deflection device including an oscillator device as recited in claim 1, wherein at least one of said oscillators is provided with an optical deflecting element configured to deflect a light beam incident thereon.

9. A driving method for an oscillation system of an oscillator device, the oscillator device including the oscillation system with an oscillator and a resilient supporting member, and a driving member configured to supply a driving force to the oscillation system based on a driving signal, wherein, when an oscillation frequency of the oscillator is to be changed from a current oscillation frequency to a target oscillation frequency, a driving signal having a driving frequency made different from the target oscillation frequency, being changed from the current driving frequency and beyond the target oscillation frequency, is temporarily outputted to the driving member, thereby to cause the driving member to drive the oscillation system.

* * * * *